(12) United States Patent
Hong et al.

(10) Patent No.: US 9,280,209 B2
(45) Date of Patent: Mar. 8, 2016

(54) METHOD FOR GENERATING 3D COORDINATES AND MOBILE TERMINAL FOR GENERATING 3D COORDINATES

(71) Applicant: RESEARCH & BUSINESS FOUNDATION SUNGKYUNKWAN UNIVERSITY, Suwon-si (KR)

(72) Inventors: Kwang-Seok Hong, Gwacheon-si (KR); Byung Hun Oh, Seoul (KR)

(73) Assignee: Research & Business Foundation Sungkyunkwan University, Suwon-si, Gyeonggi-do (KR)

( * ) Notice: Subject to any disclaimer, the term of this patent is extended or adjusted under 35 U.S.C. 154(b) by 279 days.

(21) Appl. No.: 13/767,991

(22) Filed: Feb. 15, 2013

(65) Prior Publication Data
US 2014/0044342 A1 Feb. 13, 2014

(30) Foreign Application Priority Data
Aug. 7, 2012 (KR) .................. 10-2012-0086092

(51) Int. Cl.
*G06K 9/00* (2006.01)
*G06F 3/03* (2006.01)
*G06F 3/01* (2006.01)
*G06F 3/0346* (2013.01)
*G06T 7/00* (2006.01)
*G06K 9/46* (2006.01)

(52) U.S. Cl.
CPC .............. *G06F 3/0304* (2013.01); *G06F 3/014* (2013.01); *G06F 3/017* (2013.01); *G06F 3/0346* (2013.01); *G06K 9/00355* (2013.01); *G06K 9/4652* (2013.01); *G06T 7/0042* (2013.01); *G06T 7/0083* (2013.01)

(58) Field of Classification Search
None
See application file for complete search history.

(56) References Cited

U.S. PATENT DOCUMENTS

| | | | | |
|---|---|---|---|---|
| 5,659,626 A * | 8/1997 | Ort | ..................... | G06K 9/00067 382/125 |
| 5,799,098 A * | 8/1998 | Ort | ..................... | G06K 9/00067 382/125 |
| 5,926,555 A * | 7/1999 | Ort | ..................... | G06K 9/00067 382/124 |
| 8,837,827 B2 * | 9/2014 | Zimmer | ............... | G06K 9/0061 382/164 |
| 8,941,588 B2 * | 1/2015 | Minnen | .................. | G06F 3/017 345/158 |
| 2002/0044691 A1 * | 4/2002 | Matsugu | .................. | G06K 9/20 382/218 |
| 2008/0273755 A1 * | 11/2008 | Hildreth | ....................... | 382/103 |
| 2009/0313567 A1 * | 12/2009 | Kwon et al. | .................. | 715/769 |
| 2012/0268364 A1 * | 10/2012 | Minnen | ......................... | 345/156 |
| 2012/0299820 A1 * | 11/2012 | Dahl | ............................ | 345/156 |
| 2013/0155474 A1 * | 6/2013 | Roach | .................. | G06Q 20/322 358/505 |
| 2013/0257748 A1 * | 10/2013 | Ambrus et al. | ............... | 345/173 |
| 2014/0161330 A1 * | 6/2014 | Allano | ................. | G01N 21/255 382/128 |

FOREIGN PATENT DOCUMENTS

KR 10-2011-0089021 A 8/2011

OTHER PUBLICATIONS

Jangwoon Kim et al., "Real-time Hand Pose Recogntion Using HLF", Feb. 2007, pp. 897-902.

* cited by examiner

*Primary Examiner* — Nancy Bitar
(74) *Attorney, Agent, or Firm* — Paratus Law Group, PLLC

(57) ABSTRACT

A method of generating 3D coordinates includes: acquiring a target image including a finger region with a camera of a terminal; detecting the finger region in the target image using an image processing technique; detecting a fingertip region in the finger region; and calculating 3D coordinate values using the fingertip region. Also provided is a terminal suitable for performing such a method.

18 Claims, 8 Drawing Sheets

(a)

(b)

METHOD FOR GENERATING 3D COORDINATES AND MOBILE TERMINAL FOR GENERATING 3D COORDINATES

CROSS-REFERENCE TO RELATED APPLICATION

This application claims priority to and the benefit under 35 U.S.C. §119(a) of Korean Patent Application No. 2012-0086092, filed on Aug. 7, 2012, in the Korean Intellectual Property Office, the entire disclosure of which is incorporated herein by reference for all purposes.

BACKGROUND

1. Field

The following description relates generally to a method of generating 3D coordinates using a camera in a device such as a mobile terminal, and a mobile terminal suitable for performing such a method.

2. Description of Related Art

With the recent development of engineering technologies and high-performance hardware, the role of computers in people's daily lives is becoming increasingly important. Computers that provide the convenience of various forms of web searches, online communications, e-mail exchanges, games, and the like, have become popular. Accordingly, studies regarding effective interfaces for communications between humans and computers have been actively conducted.

Further, the expansion of the gaming industry has prompted further research into new types of interface between humans and computers, providing an ample opportunity to expend the 3D interface field.

Meanwhile, with the introduction of mobile terminals such as smart phones that may well be called a miniature-version of a personal computer, studies into various interfaces with mobile terminals are being conducted. As equipment for controlling a 3-dimensional (3D) space that is constructed or modeled inside a computer or terminal, a data glove, a 3D mouse, a 3D input device using an infrared sensor, and the like, have been developed.

In particular, researches regarding technologies of estimating 3D information through analysis of images acquired by a camera in order to introduce 3D concepts are being conducted. Technologies that are currently being studied use physical devices, such as a marker, a data glove, a space ball, a stereo camera, and the like.

However, the conventional technology for acquiring 3D information using a marker to achieve a high cognition rate and easy implementation has a problem in that a marker should always exist in images. Also, in order to use a data glove, a space ball, and the like, additional cost and inconvenience are inevitable for the users.

SUMMARY

In one general aspect, there is provided a method of generating 3D coordinates, involving: acquiring a target image including a finger region with a camera of a terminal; detecting the finger region in the target image using an image processing technique; detecting a fingertip region in the finger region; and calculating 3D coordinate values using the fingertip region.

The camera may be a camera disposed on a rear face of the terminal. The detecting of the finger region, the detecting of the fingertip region and the calculating of the 3D coordinate values may be performed by a processor of the terminal. The detecting of the fingertip region may be performed using an AdaBoost algorithm.

The detecting of the finger region may involve: detecting a morphological gradient image from the target image using RGB gradient information; detecting a finger image resulting from removing a background from the target image using $YC_bC_r$ color information; and combining the morphological gradient image with the finger image to detect the finger region.

The detecting of the morphological gradient image may involve combining pixels with maximum morphological gradients with each other with respect to individual R, G, and B channels using the following equation:

$$MMGC = \sum_{j}^{height} \sum_{i}^{width} \max(MG_r(j, i), MG_g(j, i), MG_b(j, i)),$$

where i and j represent pixel coordinates, $MG_r$ represents pixels with a maximum morphological gradient in the R channel, $MG_g$ represents pixels with a maximum morphological gradient in the G channel, and $MG_b$ represents pixels with a maximum morphological gradient in the B channel.

The detecting of the finger image may involve: converting the target image into $YC_bC_r$ colors according to an RGB color model; applying a skin color threshold to the target image to binary-code the target image; and removing noise using erosion and dilation operations.

The calculating of the 3D coordinate values may involve calculating the 3D coordinate values using an x coordinate FingerRegion.x of a start point of the fingertip region, a y coordinate FingerRegion.y of the start point of the fingertip region, a width FingerWidth of the fingertip region, and a height FingerHeight of the fingertip region.

An x-coordinate value and a y-coordinate value of the 3D coordinate values may be calculated by the following equations:

$$\text{Finger Point}(x) = \text{Finger Region} \cdot x + \left(\frac{\text{Finger Width}}{2}\right), \text{ and}$$

$$\text{Finger Point}(y) = \text{Finger Region} \cdot y + \left(\frac{\text{Finger Height}}{2}\right).$$

A z-coordinate value of the 3D coordinate values may be set using a distance between the camera and the finger, the distance calculated by the following equation:

$$FingertoCameraDistance = \frac{\text{finger width (cm)} \times \text{preview width (pixel)}}{\text{pixel distace of finger width (pixel)} \times \tan(FOV/2) \times 2},$$

where the fingerwidth represents the width of a user's real finger, the previewwidth represents the number of pixels corresponding to the width of the target image input to the camera, the pixel distance of finger width represents the number of pixels corresponding to the width of the fingertip region and the FOV represents a viewing angle of the camera.

In another aspect, there is provided a mobile terminal for generating 3D coordinates, the mobile terminal including: a camera configured to acquire a target image including a finger region; a finger region detection module configured to detect the finger region from the target image using an image processing technique; a fingertip region detection module configured to detect a fingertip region front the finger region; and a 3D coordinates calculating module configured to calculate 3D coordinate values using the fingertip region.

The camera may be a camera disposed on a rear face of the terminal. The fingertip region detection module may be configured to detect the fingertip region from the finger region using an AdaBoost algorithm.

The finger region detection module may be configured to detect a morphological gradient image from the target image using RGB gradient information, to detect a finger image resulting from removing a background from the target image using $YC_bC_r$ color information, and to combine the morphological gradient image with the finger image to detect the finger region.

The finger region detection module may be configured to combine pixels with maximum morphological gradients with each other with respect to individual R, G, and B channels using the following equation to detect the morphological gradient image:

$$MMGC = \sum_{j}^{height} \sum_{i}^{width} \max(MG_r(j, i), MG_g(j, i), MG_b(j, i))$$

where i and j represent pixel coordinates, $MG_r$ represents pixels with a maximum morphological gradient in the R channel, $MG_g$ represents pixels with a maximum morphological gradient in the G channel, and $MG_b$ represents pixels with a maximum morphological gradient in the B channel.

The finger region detection module may be configured to convert the target image into $YC_bC_r$ colors according to an RGB color model, to apply a skin color threshold to the target image to binary-code the target image, and to remove noise using erosion and dilation operations, to thereby detect the finger image.

The 3D coordinate calculating module may be configured to calculate the 3D coordinate values using an x coordinate FingerRegion.x of a start point of the fingertip region, a y coordinate FingerRegion.y of the start point of the fingertip region, a width FingerWidth of the fingertip region, and a height FingerHeight of the fingertip region.

The x-coordinate value and the y-coordinate value of the 3D coordinate values may be calculated by the following equations:

$$\text{Finger Point}(x) = \text{Finger Region} \cdot x + \left(\frac{\text{Finger Width}}{2}\right), \text{ and}$$

$$\text{Finger Point}(y) = \text{Finger Region} \cdot y + \left(\frac{\text{Finger Height}}{2}\right).$$

The z-coordinate value of the 3D coordinate values may be set using a distance between the camera and the finger, the distance calculated by the following equation:

$$FingertoCameraDistance = \frac{\text{finger width (cm)} \times \text{preview width (pixel)}}{\text{pixel distace of finger width (pixel)} \times \tan(FOV/2) \times 2},$$

where the fingerwidth represents the width of a user's real finger, the previewwidth represents the number of pixels corresponding to the width of the target image input to the camera, the pixel distance of finger width represents the number of pixels corresponding to the width of the fingertip region, and the FOV represents a viewing angle of the camera.

In another general aspect, there is provided a mobile terminal for generating 3D coordinates using a finger image, involving: a camera configured to acquire a target image including a finger region; a memory in which a finger region detection code for detecting the finger region from the target image using an image processing technique, a fingertip region detection code for detecting a fingertip region from the finger region, and a 3D coordinate calculating code for calculating 3D coordinate values using the fingertip region are stored; and a processor configured to execute the finger region detection code stored in the memory to detect the finger region from the target image acquired by the camera, to execute the fingertip region detection code stored in the memory to detect the fingertip region from the finger region, and to execute the 3D coordinate calculating code stored in the memory to calculate the 3D coordinate values.

The camera may be a camera disposed on a rear face of the mobile terminal. The fingertip region detection code for detecting the fingertip region from the finger region may use an AdaBoost algorithm.

The processor may execute the finger region detection code to detect a morphological gradient image from the target image using RGB gradient information, may detect a finger image resulting from removing a background from the target image using $YC_bC_r$ color information, and may combine the morphological gradient image with the finger image to detect the finger region.

The processor may calculate the 3D coordinate values using an x coordinate FingerRegion.x of a start point of the fingertip region, a y coordinate FingerRegion.y of the start point of the fingertip region, a width FingerWidth of the fingertip region, and a height FingerHeight of the fingertip region.

The processor may calculate an x-coordinate value of the 3D coordinate values using the x coordinate of the start point of the fingertip region.

The processor may calculate a y-coordinate value of the 3D coordinate values using the y coordinate of the start point of the fingertip region.

The processor may calculate a distance between the camera and the finger based on a change of at least one of the width, height and area of the fingertip region to set a z-coordinate value of the 3D coordinate values.

Other features and aspects may be apparent from the following detailed description, the drawings, and the claims.

Figure 1:
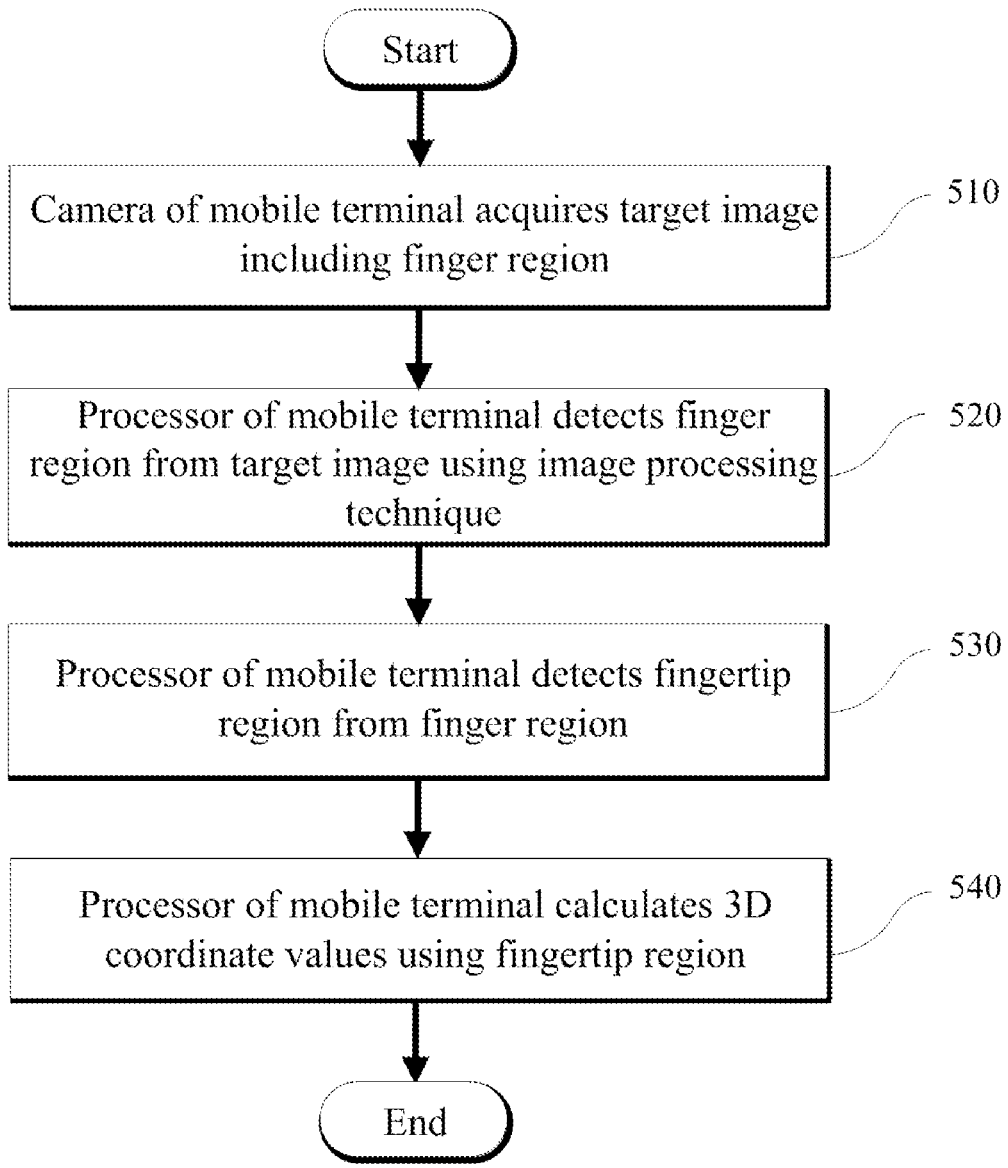
FIG. 1 is a flowchart illustrating an example of a method of generating 3D coordinates using a finger image obtained by a camera of a mobile terminal.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The presently described examples will be understood by reference to the drawings, wherein like parts are designated by like numerals throughout. The drawings are not necessarily drawn to scale, and the size and relative sizes of the layers and regions may have been exaggerated for clarity.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Before starting detailed explanations of figures, components that will be described in the specification are discriminated merely according to functions mainly performed by the components or conventionally carried out according to common knowledge of related technical fields. That is, two or more components which will be described later can be integrated into a single component. Furthermore, a single component which will be explained later can be separated into two or more components. Moreover, each component which will be described can additionally perform some or all of a function executed by another component in addition to the main function thereof. Some or all of the main function of each component which will be explained can be carried out by another component. Accordingly, presence/absence of each component which will be described throughout the specification should be functionally interpreted.

Hereinafter, a method of generating 3D coordinates using a finger image obtained by to a camera on a terminal, and a mobile terminal for generating 3D coordinates using a finger image obtained by its camera will be described in detail with reference to various drawings. Such a mobile terminal may have a camera on the rear face of the mobile terminal. There may be a display screen on the front side of the camera. In the alternative, the camera may be positioned on the front side. Further, the camera may be a monochromatic camera (or mono camera) or a color camera, and the camera may take still image photographs or shoot a video.

FIG. 1 is a flowchart illustrating an example of a method of generating 3D coordinates using a finger image taken by a camera located on a rear face of a mobile terminal. The examples of mobile terminals suitable for use include a mobile phone, a tablet PC, a smart phone, iPad, and various kinds of terminals with a camera.

The method of generating 3D coordinates using a finger image input to a camera of a terminal, may include steps of: at the camera of the terminal, acquiring a target image including a finger region (510); at a processor of the terminal, detecting the finger region from the target image using an image processing technique (520); at the processor of the terminal, detecting a fingertip region from the finger region using an Adaptive Boosting (AdaBoost) algorithm (530); and at the processor of the terminal, calculating 3D coordinate values using the fingertip region (540). The camera may be a camera located on the rear face of the terminal. In the alternative, the camera may be a color camera, or may be located on the front side of the camera where a display screen is located. Also, a color image of the finger can be converted to a gray-scale image by a processor of the mobile terminal before further analyzing the image to calculate the 3D coordinate values.

The target image is photographed by an image acquiring device including a camera. In this example, the terminal uses a camera installed therein. However, in other examples, it is possible to connect an external camera to the terminal, either through a cable or through a wireless connection. Since it is general for 3D coordinate values to be input in real time to a 3D interface, it is preferable to acquire a target image through a camera installed in the rear face or the back surface of a terminal, which may found on the opposite side of the terminal from the display panel of the terminal.

In this example, detecting the finger region (520) may involve: detecting a morphological gradient image from the target image using RGB gradient information (521); detecting a finger image resulting from removing a background from the target image using $YC_bC_r$ color information (522); and combining the morphological gradient image with the finger image to detect a finger region (523).

Figure 2:
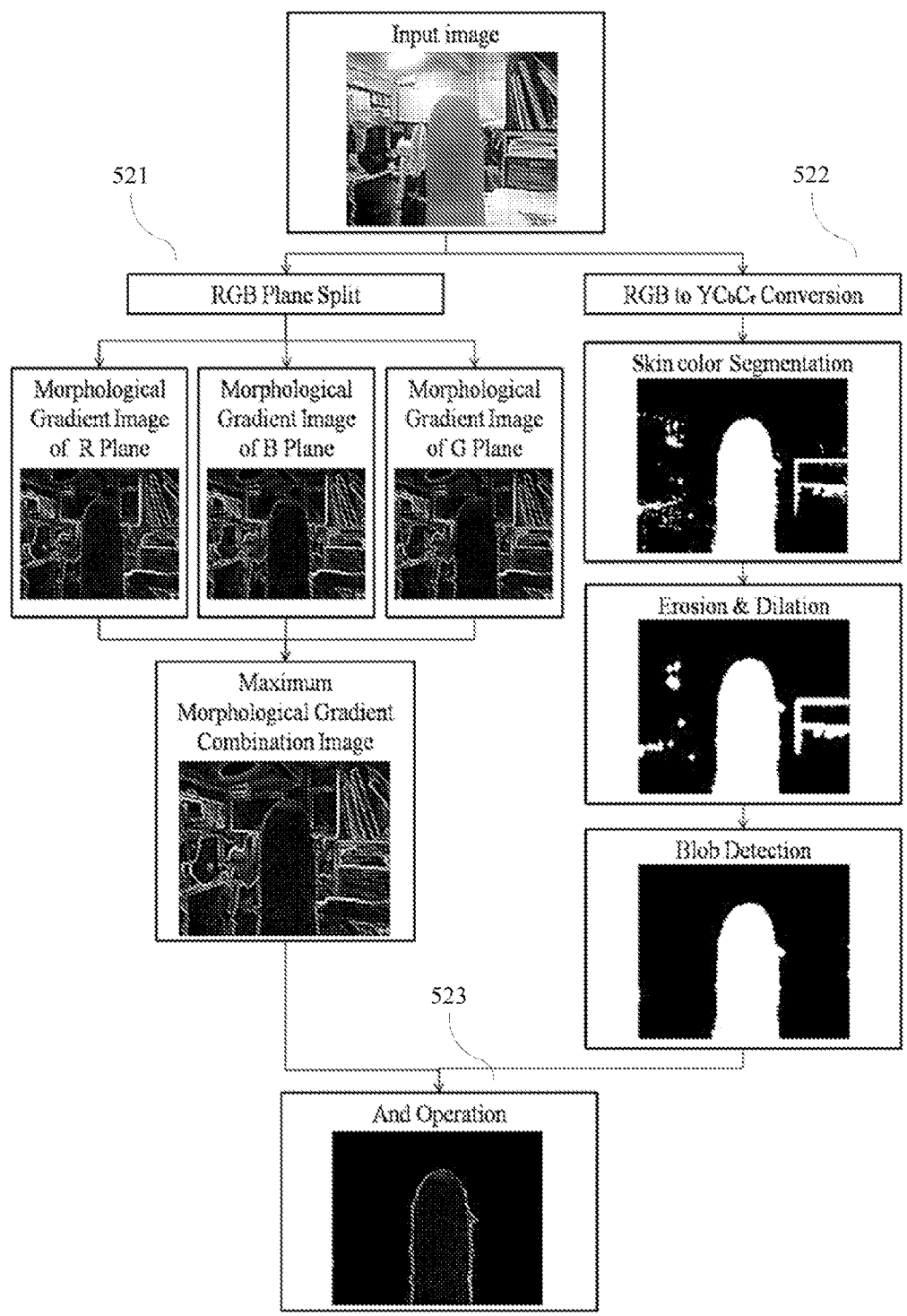
FIG. 2 is a flowchart illustrating an example of a process of detecting a finger region.

FIG. 2 is a flowchart illustrating an example of a process of detecting a finger region.

In operation 521, in order to highlight gradient components required for detecting a finger object, pixels with maximum morphological gradients with respect to three channels of R, G, and B are combined with each other. The resultant image is called a maximum morphological gradient combination (MMGC) image, and an equation for obtaining the MMGC image can be expressed by equation 1, below.

$$MMGC = \sum_{j}^{height} \sum_{i}^{width} \max(MG_r(j, i), MG_g(j, i), MG_b(j, i)), \quad (1)$$

where i and j represent pixel coordinates, $MG_r$ represents pixels with a maximum morphological gradient in the R channel, $MG_g$ represents pixels with a maximum morphological gradient in the G channel, and $MG_b$ represents pixels with a maximum morphological gradient in the B channel.

The process of detecting a finger image (522) may involve: converting the target image into $YC_bC_r$ colors according to an RGB color model; applying a skin color threshold to the target image; and removing noise using erosion and dilation operations. Operation 522 is aimed at acquiring only a finger part from the target image, and an image acquired in operation 522 is referred to as a finger image.

The skin color threshold SkinColor for separating the finger image from the background may be set by equation 2, below.

$$SkinColor(x, y) = \begin{cases} 1 & \text{if } (77 \leq C_b \leq 127) \cap (133 \leq C_r \leq 173) \\ 0 & \text{Otherwise} \end{cases} \quad (2)$$

The skin color threshold may depend on a skin color, and one of ordinary skill in the art will be able to easily set the skin color threshold.

The detected skin color region may be segmented into binary images; thereafter, noise may be removed from the binary images through a closing operation using erosion and dilation operations. When the noise is removed, a phenomenon in which a large-scale region among regions with the skin color is not removed may occur. In this case, in order to remove all other parts except for a finger image, the individual regions are labeled and then only a finger image is detected. Thereby, a finger image from which the background has been removed is detected (blob detection).

Then, in operation 523, the image subject to MMGC in operation 521 is combined with the finger image detected in operation 522, thereby finally acquiring a finger image.

Thereafter, in operation 530, a fingertip region is detected from the finger image. In this example, the finger region refers to a user's whole finger part in the target image, and the fingertip region refers to the end part of the finger region in the target image, which is a criterion for setting the coordinate values. In this example, the fingertip region is detected using the AdaBoost algorithm.

The basic concept of the AdaBoost algorithm is to create strong classifiers with high detection performance by linearly combining weak classifiers with each other.

In the AdaBoost algorithm, weak classifiers are generated by repeated computations using samples of individual classes, and the generated weak classifiers are combined to create strong classifiers. The AdaBoost algorithm is a method of initially allocating the same weight to all samples to determine weak classifiers, and then, as the number of steps increases, allocating a lower error weight to data classified as correct data while allocating a higher error weight to data classified as incorrect data with respect to the basic classifiers to thereby improve the performance of the weak classifiers.

Figure 3:
FIG. 3 illustrates examples of positive images and negative images that are used to generate a classifier of an Adaptive Boosting (AdaBoost) algorithm for detecting a fingertip region.
Figure 3:
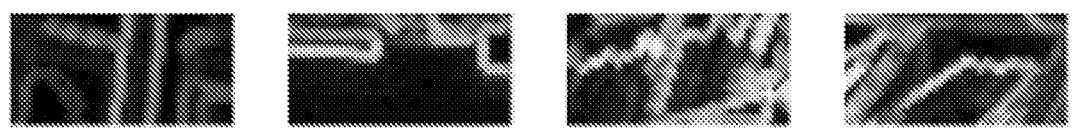

FIG. 3 shows examples of positive images and negative images that are used to generate a classifier of the AdaBoost algorithm for detecting a fingertip region. The positive images are images corresponding to fingertip regions, and the negative images are images corresponding to regions other than the fingertip regions. Through repeated learning, a final module is prepared. The AdaBoost algorithm is well known to one of ordinary skill in the art; accordingly, a detailed description thereof will be omitted.

Figure 4:
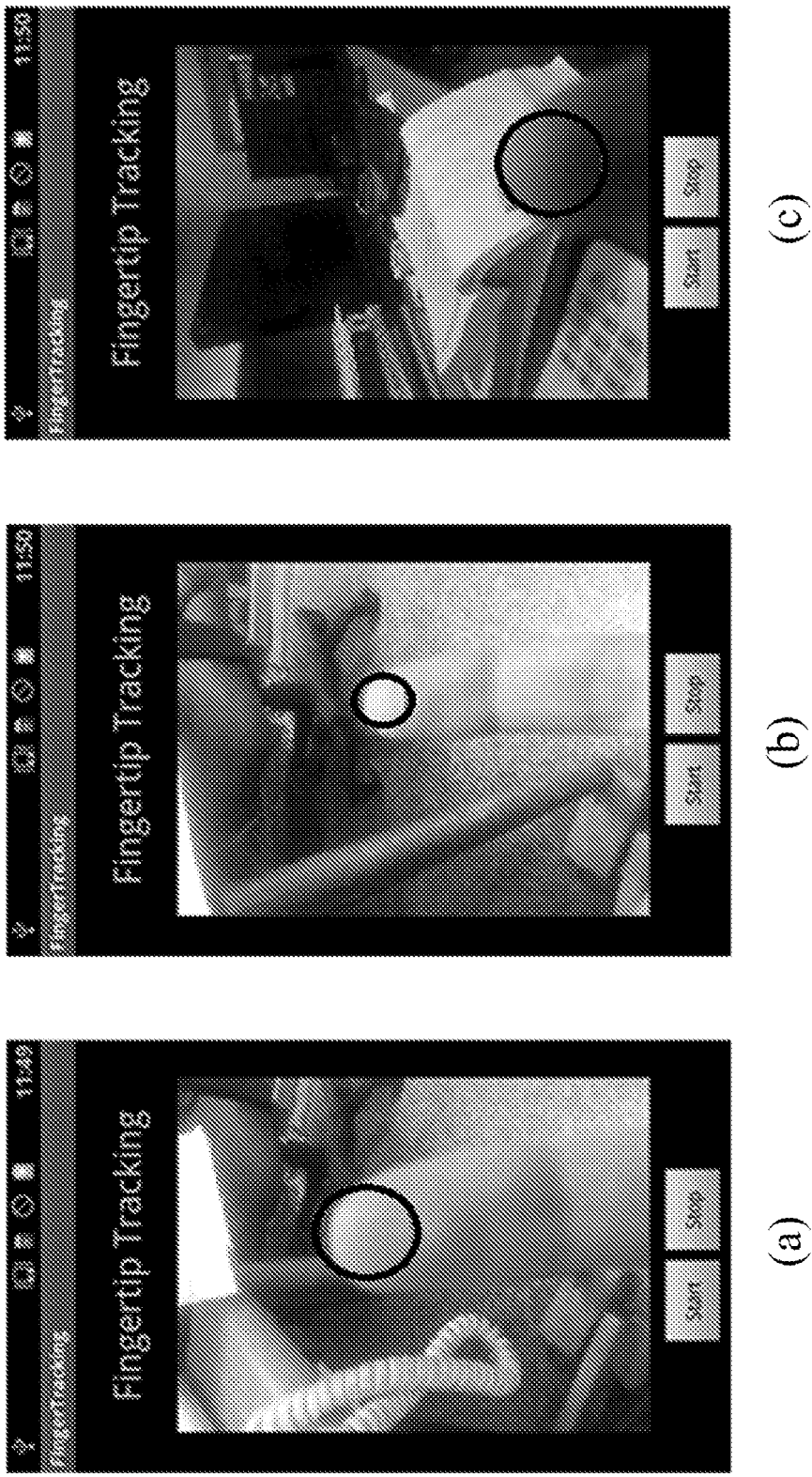
FIG. 4 illustrates examples of screens displaying fingertip regions detected by the AdaBoost algorithm.

FIG. 4 shows examples of screens displaying fingertip regions detected by the AdaBoost algorithm. A region surrounded by a circle in FIG. 4 (*a*) is a fingertip region. FIG. 4(*a*) illustrates the image of a display screen when an image of a finger is obtained when the finger is located relatively close to a camera of the terminal. FIG. 4(*b*) illustrates an image obtained when the finger is located relatively distant from the camera. FIG. 4(*c*) illustrates the image of a display screen in an example in which a fingertip region has been detected from a picture having a different background.

Figure 5:
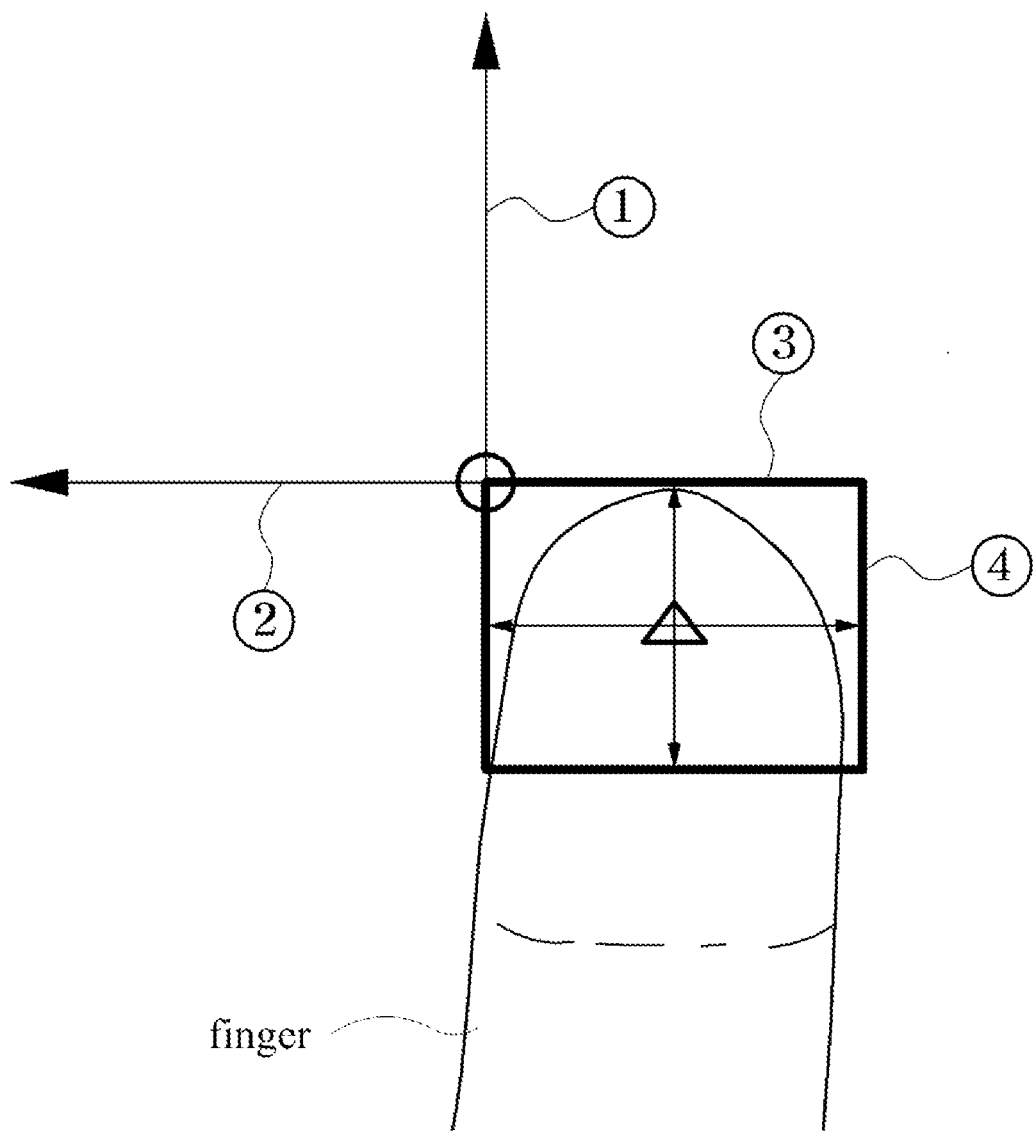
FIG. 5 is a diagram explaining various variables of a fingertip region according to an example method of generating 3D coordinates.

FIG. 5 is an example of a diagram that explains various regions of a fingertip region, which are used to generate the 3D coordinates. A region surrounded by a rectangular box located in the center region of FIG. 5 corresponds to a fingertip region. The upper left corner of the rectangular box, denoted by a circle, is a start point of the fingertip region. ① represents the y-coordinate value (the y axial length) of the start point of the fingertip region. ① is a criterion for calculating the y-coordinate value of the fingertip region in the target image. ② represents the x-coordinate value (the x axial length) of the start point of the fingertip region. ③ represents the height of the fingertip region, and ④ represents the width of the fingertip area. In FIG. 5, the center location (denoted by a triangle) of the rectangular box is a criterion for measuring 3D coordinate values.

In operation S540, 3D coordinate values are calculated using the x coordinate FingerRegion.x of the start point of the fingertip region, the y coordinate FingerRegion.y of the start point of the fingertip region, the width FingerWidth of the fingertip region, and the height FingerHeight of the fingertip region.

The x-coordinate value FingerPoint(x) of the 3D coordinate values is calculated by equation 3, below.

$$\text{Finger Point}(x) = \text{Finger Region} \cdot x + \left(\frac{\text{Finger Width}}{2}\right), \quad (3)$$

where FingerRegion.x is the x coordinate of the start point of a finger region detected from an input image, and FingerWidth is the width of the detected finger region.

First, the width FingerWidth of the finger region is divided in half to set the center of the finger region, and the x coordinate FingerRegion.x of the start point of the finger region is added to the value divided in half, thereby setting the x coordinate of a finger pointer in the input image.

The y-coordinate value FingerPoint(y) of the 3D coordinate values is calculated by equation 4, below.

$$\text{Finger Point}(y) = \text{Finger Region} \cdot y + \left(\frac{\text{Finger Height}}{2}\right), \quad (4)$$

where FingerRegion.y is the y coordinate of the start point of the finger region detected from the input image, and FingerHeight is the height of the detected finger region.

First, the height FingerHeight of the finger region is divided in half to set the center of the finger region, and the y coordinate FingerRegion.y of the start point of the finger region is added to the value divided in half, thereby setting the y coordinate of the finger pointer in the input image.

The z-coordinate value of the 3D coordinate values is set using the distance FingertoCameraDistance between the mono camera and the finger, wherein the distance is calculated by equation 5, below. The distance between the camera and the finger is estimated using the area of a fingertip region. That is, by comparing the area of a fingertip region at a reference distance with the area of the fingertip region currently input through the camera, the distance between camera and the finger can be estimated.

$$FingertoCameraDistance = \frac{\text{finger width (cm)} \times \text{preview width (pixel)}}{\text{pixel distace of finger width (pixel)} \times \tan(FOV/2) \times 2}, \quad (5)$$

where fingerwidth is the width of the user's real finger, previewwidth is the number of pixels corresponding to the width of the target image input to the mono camera, pixel distance of finger width is the number of pixels corresponding to the width of the fingertip region and FOV (Field of View) is an angle in degrees that describes the field of view of a camera observing a specific point (the fingertip region).

If the distance between the camera and the finger is measured using equation the relative location of the z coordinate at which the finger is located can be recognized.

The present example relates to a method of calculating 3D coordinates after setting the start point of a fingertip region to the upper left corner of a rectangular block, however, it is obvious to one of ordinary skill in the art that the start point of a fingertip region can be set to another location or that a point other than the center of the fingertip region can be used as a reference point of coordinates.

According to another example, a mobile terminal 100 for generating 3D coordinates using a finger region input to a mono camera comprises a mono camera 110 for acquiring a target image including the finger region, a finger region detection module 120 for detecting the finger region from the target image using an image processing technique, a fingertip region detection module 130 for detecting a fingertip region from the finger region using an AdaBoost algorithm, and a 3D coordinate calculating module 140 for calculating 3D coordinate values using the fingertip region.

Figure 6:
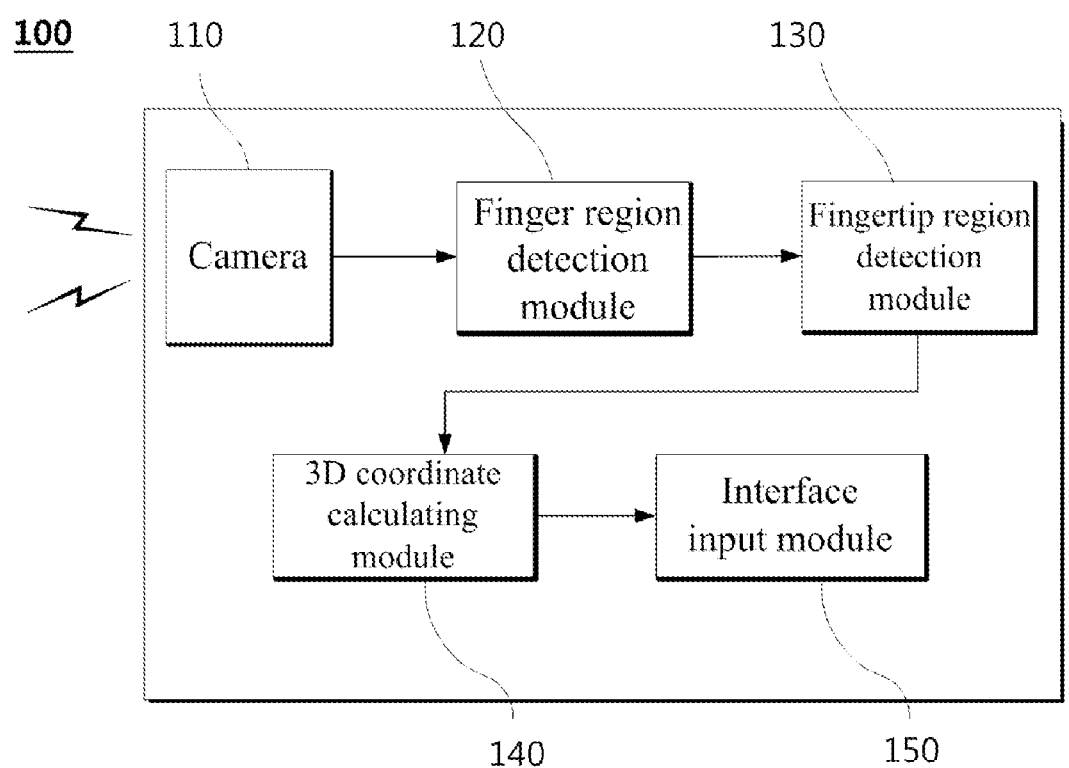
FIG. 6 is a block diagram illustrating an example of a mobile terminal for generating 3D coordinates using a finger image obtained by a camera.

An interface input module 150 shown in FIG. 6 receives final 3D coordinates calculated by the 3D coordinate calculating module 140. The 3D coordinates received by the interface input module 150 are used as an input for controlling a specific object in an application that is driven by the mobile terminal 100.

FIG. 6 is a block diagram schematically showing the configuration of the mobile terminal 100 for generating 3D coordinates using a finger image input to a mono camera, according to another embodiment of the present disclosure. Content overlapping that described above in the method of generating the 3D coordinates using the finger image input to the mono camera of the mobile terminal will be briefly described.

The finger region detection module 120 detects a morphological gradient image from a target image using RGB gradient information, detects a finger image resulting from removing a background from the target image using $YC_bC_r$ color information, and combines the morphological gradient image with the finger image to detect a finger region.

The finger region detection module 120 (1) combines pixels with maximum morphological gradients with each other with respect to individual R, G, and B channels to detect a morphological gradient image from a target image; (2) converts the target image into $YC_bC_r$ colors according to an RGB color model, applies a skin color threshold to the resultant target image, and removes noise using erosion and dilation operations to detect a finger image; and (3) combines the morphological gradient image with the finger image to thereby finally detect a finger region.

The 3D coordinate calculating module 140 calculates 3D coordinate values using the x coordinate FingerRegion.x of the start point of the fingertip region, the y coordinate FingerRegion.y of the start point of the fingertip region, the width FingerWidth of the fingertip region, and the height FingerHeight of the fingertip region.

Figure 7:
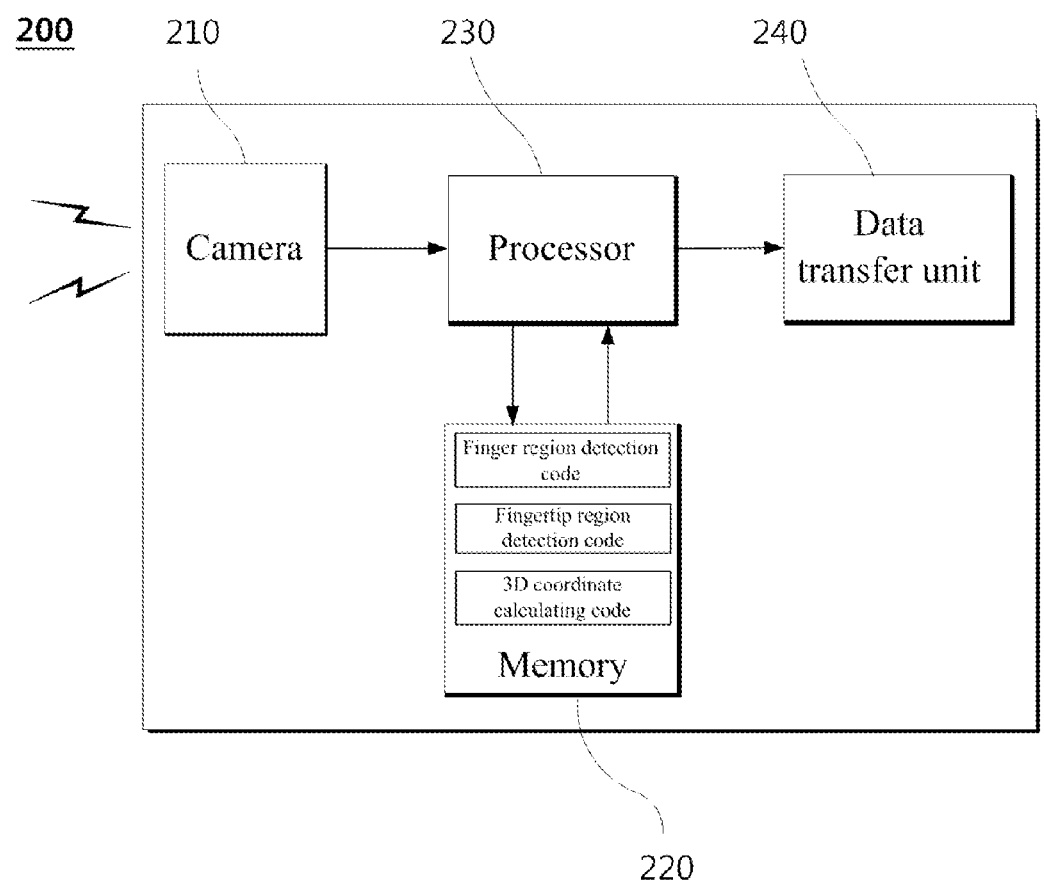
FIG. 7 is a block diagram illustrating another example of a mobile terminal for generating 3D coordinates using a finger image obtained by a camera.

FIG. 7 is a block diagram illustrating an example of the configuration of a mobile terminal 200 for generating 3D coordinates using a finger image input to a camera according to another example. The mobile terminal 200 shown in FIG. 7 is different from that mobile terminal 100 illustrated in FIG. 6 in that 3D coordinates are calculated by a software component of the mobile terminal instead of individual components being configured as separate modules. In this example, the camera 210 is a monochromatic camera. However, the camera 210 may be a color camera. In such an example, the color image of a finger captured by the camera 210 may be converted to a monochromatic image in the processor 230.

The mobile terminal 200 for generating the 3D coordinates using the finger image input to the camera, as shown in FIG. 7, includes: a camera 210 for acquiring a target image including a finger region; a memory 220 in which a finger region detection code for detecting the finger region from the target image using an image processing technique, a fingertip region detection code for detecting a fingertip region from the finger region using an AdaBoost algorithm, a 3D coordinate calculating code for calculating 3D coordinate values using the fingertip region are stored; and a processor 230 for executing the finger region detection code stored in the memory 220 to detect the finger region from the target image acquired by the mono camera 210, executing the fingertip region detection code stored in the memory 220 to detect the fingertip region from the finger region, and executing the 3D coordinate calculating code stored in the memory 220 to calculate the 3D coordinate values.

A data transfer unit 240 may transfer the 3D coordinates created by the processor 230. Meanwhile, since 3D coordinates can be directly used by a specific application, etc., no separate transfer unit may be required.

FIG. 7 relates to an embodiment in which 3D coordinate values are calculated through an application or software that is executed by the mobile terminal 200.

When the finger region detection code is executed by the processor 230, the processor 230 executes the finger region detection code to detect a morphological gradient image from a target image using RGB gradient information, and detects a finger image resulting from removing a background from the target image using $YC_bC_r$ color information, and combines the morphological gradient image with the finger image to thereby detect a finger region.

When the 3D coordinate calculating code is executed by the processor 230, the processor 230 calculates 3D coordinate values using the x coordinate FingerRegion.x of the start point of a fingertip region, the y coordinate FingerRegion.y of the start point of the fingertip region, the width FingerWidth of the fingertip region, and the height FingerHeight of the fingertip region.

The processor 230 calculates the x-coordinate value of the 3D coordinate values using the x coordinate of the start point of the fingertip region, calculates the y-coordinate value of the 3D coordinate values using the y coordinate of the start point of the fingertip region, and calculates the distance between the camera 210 and the finger based on a change of at least one of the width, height and area of the fingertip region to set the z-coordinate value of the 3D coordinate values.

Figure 8:
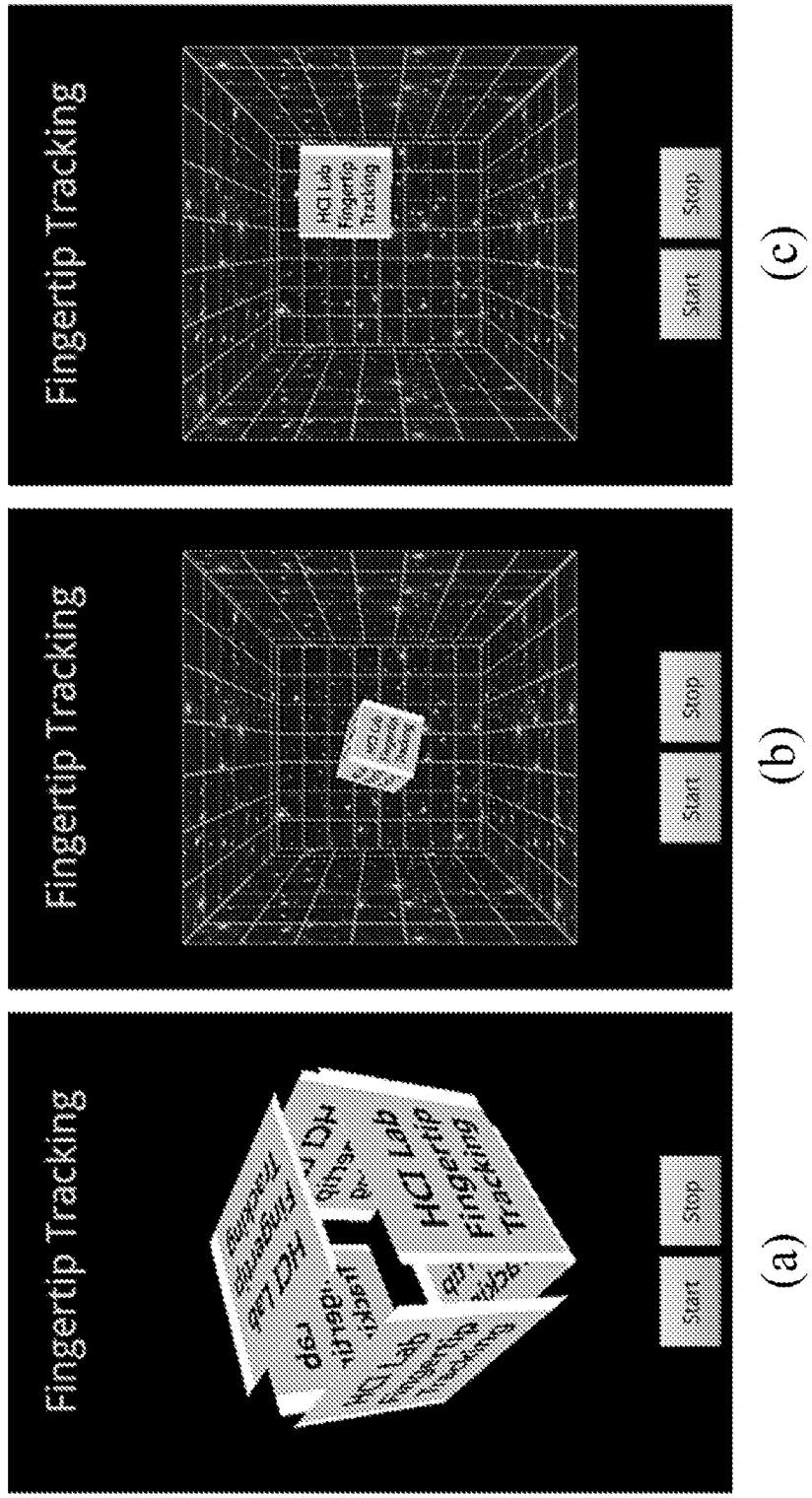
FIG. 8 illustrates examples of 3D objects and display screens of a mobile terminal that are controlled by an example of a method of generating 3D coordinates.

FIG. 8 shows examples of 3D objects on display screens that are controlled by the method of generating the 3D coordinates or by the mobile terminal for generating the 3D coordinates. FIG. 8(a) illustrates an example of an object (a cubic box shape, in this instance) for receiving an input of a 3D interface and moving the 3D interface. FIGS. 8 (*b*) and (*c*) illustrate screens on which the object shown in FIG. 8(*a*) moves in a 3D space. The screens shown in FIGS. 8(*a*), (*b*), and (*c*) are examples of display screens that are displayed when a user moves an object in an application.

The method of generating the 3D coordinates using the finger image input to the camera of the mobile terminal, or the mobile terminal for generating the 3D coordinates using the finger image input to the camera were tested in view of effects, as follows.

With regard to learning of detectors for the AdaBoost algorithm, 2240 positive images and 4500 negative images were used, a total of 13 steps for the detectors were set, and the size of each detector was set to 20×10.

In the first test, the performance of detecting finger coordinate references that were used as x- and y-coordinate values was evaluated. In the second test, the performance of estimating a distance using a finger area, which was used as a z-coordinate value, was evaluated.

In order to evaluate the performance of the finger detection method, tests were conducted with respect to five intensities of illuminations as shown in Table 1.

TABLE 1

|  | Place | Intensity of Illumination(lux) |
|---|---|---|
| Condition 1 | Public areas with dark surroundings | 20 |
| Condition 2 | Office | 400 |
| Condition 3 | Corridor | 1,000 |
| Condition 4 | Outdoor in shade | 2,000 |
| Condition 5 | Outdoor in sunny side | 60,000 |

The performance of the finger detection method was evaluated with respect to the individual intensities of illumination under various conditions, and the results of the evaluation are shown in Table 2 below.

TABLE 2

|  | Hit | Missed | False | Detection rate |
|---|---|---|---|---|
| Condition 1 | 96 | 4 | 1 | 95% |
| Condition 2 | 98 | 2 | 0 | 98% |
| Condition 3 | 97 | 3 | 2 | 95% |
| Condition 4 | 99 | 1 | 2 | 97% |
| Condition 5 | 95 | 5 | 2 | 94% |
| Average | 98 | 2 | 1.2 | 97% |

A set of 100 images for each intensity of illumination were tested, meaning that a total of 500 images were tested. The results of the test showed a finger detection rate of 96% under various conditions. That is, the results of the test show the fact that a detection rate at which a reference point for creating 3D coordinate values is detected is very high.

In order to evaluate the performance of distance estimation using a finger area, a set of 100 frames were estimated at an interval of 0.5 cm from 0.5 cm to 5 cm, as shown in the following Table 3, and the error rates were calculated.

TABLE 3

| Actual Distance (cm) | 0.5 | 1 | 1.5 | 2 | 2.5 |
|---|---|---|---|---|---|
| Estimated Distance (cm) | 0.52 | 0.97 | 0.51 | 2.04 | 2.53 |
| Error Rate (%) | 4 | 3 | 0.5 | 2 | 1.2 |

TABLE 3-continued

| Actual Distance (cm) | 3 | 3.5 | 4 | 4.5 | 5 |
|---|---|---|---|---|---|
| Estimated Distance (cm) | 2.95 | 3.6 | 4.15 | 4.59 | 5.18 |
| Error Rate (%) | 1.8 | 2.6 | 3.8 | 1.9 | 3.6 |

The average error rate of distance estimation was calculated as 2.44%. Accordingly, it will be understood that setting a z-coordinate value using a width of finger has high accuracy.

Various examples of methods of generating 3D coordinate values and examples of mobile terminals suitable for use with such a method are described above.

In an example of such a method, a mobile terminal for generating 3D coordinates using a finger image input to a mono camera is described. Such a mobile terminal may include: a mono camera configured to acquire a target image including a finger region; a finger region detection module configured to detect the finger region from the target image using an image processing technique; a fingertip region detection module configured to detect a fingertip region from the finger region using an AdaBoost algorithm; and a 3D coordinate calculating module configured to calculate 3D coordinate values using the fingertip region.

The finger region detection module may detect a morphological gradient image from the target image using RGB gradient information, detect a finger image resulting from removing a background from the target image using $YC_bC_r$ color information, and combine the morphological gradient image with the finger image to detect a finger region.

The finger region detection module may combine pixels with maximum morphological gradients with each other with respect to individual R, G, and B channels to detect a morphological gradient image.

The finger region detection module may convert the target image into $YC_bC_r$ colors according to an RGB color model, apply a skin color threshold to the target image to binary-code the target image, and remove noise using erosion and dilation operations, to thereby detect the finger image.

The 3D coordinate calculating module may calculate the 3D coordinate values using an x coordinate FingerRegion.x of a start point of the fingertip region, a y coordinate FingerRegion.y of the start point of the fingertip region, a width FingerWidth of the fingertip region, and a height FingerHeight of the fingertip region.

In another example, there is provided a mobile terminal for generating 3D coordinates using a finger image input to a mono camera, including: a mono camera configured to acquire a target image including a finger region; a memory in which a finger region detection code for detecting the finger region from the target image using an image processing technique, a fingertip region detection code for detecting a fingertip region from the finger region using an AdaBoost algorithm, and a 3D coordinate calculating code for calculating 3D coordinate values using the fingertip region are stored; and a processor configured to execute the finger region detection code stored in the memory to detect the finger region from the target image acquired by the mono camera, to execute the fingertip region detection code stored in the memory to detect the fingertip region from the finger region, and to execute the 3D coordinate calculating code stored in the memory to calculate the 3D coordinate values.

When the finger region detection code is executed, the finger The processor may execute the finger region detection code to detect a morphological gradient image from the target image using RGB gradient information, detects a finger image resulting from removing a background from the target image using $YC_bC_r$ color information, and combines the morphological gradient image with the finger image to detect a finger region.

When the 3D coordinate calculating code is executed, the processor may calculate the 3D coordinate values using an x coordinate FingerRegion.x of a start point of the fingertip region, a y coordinate FingerRegion.y of the start point of the fingertip region, a width FingerWidth of the fingertip region, and a height FingerHeight of the fingertip region.

The processor may calculate an x-coordinate value of the 3D coordinate values using the x coordinate of the start point of the fingertip region, calculate a y-coordinate value of the 3D coordinate values using the y coordinate of the start point of the fingertip region, and calculate a distance between the mono camera and the finger based on a change of at least one of the width, height and area of the fingertip region to set a z-coordinate value of the 3D coordinate values.

Therefore, the method of generating 3D coordinates in the mobile terminal, according to this example, provides a 3D interface unit through movement of the index finger of a hand holding the terminal, using a rear-facing mono camera installed in the mobile terminal, without using separate equipment. The 3D coordinate generating method may allow users to use various 3D contents, and may provide developers with an interface for effectively controlling objects in a 3D space. Furthermore, the 3D coordinate generating method may be applied to a variety of devices with a camera, other than a mobile terminal. For example, the 3D coordinate generating method may be applied to a controller of a game machine.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating 3D coordinates, comprising:
    acquiring a target image including a finger region with a camera of a terminal;
    detecting the finger region in the target image using a morphological gradient image including maximum morphological gradients among R channel, G channel and B channel at each pixel of the target image;
    detecting a fingertip region in the finger region; and
    calculating 3D coordinate values using the fingertip region,
    wherein the detecting of the finger region comprises:
    detecting the morphological gradient image from the target image using RGB gradient information;
    detecting a finger image resulting from removing a background from the target image using YCbCr color information; and
    combining the morphological gradient image with the finger image to detect the finger region,
    wherein the detecting of the morphological gradient image comprises combining pixels with the maximum morphological gradients with each other with respect to individual R, G, and B channels using the following equation:

$$MMGC = \sum_{j}^{height} \sum_{i}^{width} \max(MG_r(j, i), MG_g(j, i), MG_b(j, i)),$$

where i and j represent pixel coordinates, MGr represents pixels with a maximum morphological gradient in the R channel, MGg represents pixels with a maximum morphological gradient in the G channel, and MGb represents pixels with a maximum morphological gradient in the B channel.

2. The method of claim 1, wherein the camera is a camera disposed on a rear face of the terminal; the detecting of the finger region, the detecting of the fingertip region and the calculating of the 3D coordinate values are performed by a processor of the terminal; and the detecting of the fingertip region is performed using an AdaBoost algorithm.

3. The method of claim 1, wherein the detecting of the finger image comprises:
    converting the target image into YCbCr colors according to an RGB color model;
    applying a skin color threshold to the target image to binary-code the target image; and
    removing noise using erosion and dilation operations.

4. The method of claim 1, wherein the calculating of the 3D coordinate values comprises calculating the 3D coordinate values using an x coordinate FingerRegion.x of a start point of the fingertip region, a y coordinate FingerRegion.y of the start point of the fingertip region, a width FingerWidth of the fingertip region, and a height FingerHeight of the fingertip region.

5. The method of claim 4, wherein an x-coordinate value and a y-coordinate value of the 3D coordinate values are calculated by the following equations:

$$\text{Finger Point}(x) = \text{Finger Region} \cdot x + \left(\frac{\text{Finger Width}}{2}\right), \text{ and}$$

$$\text{Finger Point}(y) = \text{Finger Region} \cdot y + \left(\frac{\text{Finger Height}}{2}\right).$$

6. The method of claim 4, wherein a z-coordinate value of the 3D coordinate values is set using a distance between the camera and the finger, the distance calculated by the following equation:

$$FingertoCameraDistance = \frac{\text{finger width (cm)} \times \text{preview width (pixel)}}{\text{pixel distace of finger width (pixel)} \times \tan(FOV/2) \times 2},$$

where the fingerwidth represents the width of a user's real finger, the previewwidth represents the number of pixels corresponding to the width of the target image input to the camera, the pixel distance of finger width represents the number of pixels corresponding to the width of the fingertip region and the FOV represents a viewing angle of the camera.

7. A mobile terminal for generating 3D coordinates, comprising:
    a camera configured to acquire a target image including a finger region;
    a finger region detection module configured to detect the finger region from the target image using a morphological gradient image including maximum morphological gradients among R channel, G channel and B channel at each pixel of the target image;

a fingertip region detection module configured to detect a fingertip region from the finger region; and a 3D coordinate calculating module configured to calculate 3D coordinate values using the fingertip region, wherein the finger region detection module is configured to detect the morphological gradient image from the target image using RGB gradient information, to detect a finger image resulting from removing a background from the target image using YCbCr color information, and to combine the morphological gradient image with the finger image to detect the finger region, wherein the finger region detection module is configured to combine pixels with the maximum morphological gradients with each other with respect to individual R, G, and B channels using the following equation to detect the morphological gradient image:

$$MMGC = \sum_{j}^{height} \sum_{i}^{width} \max(MG_r(j, i), MG_g(j, i), MG_b(j, i)),$$

where i and j represent pixel coordinates, MGr represents pixels with a maximum morphological gradient in the R channel, MGg represents pixels with a maximum morphological gradient in the G channel, and MGb represents pixels with a maximum morphological gradient in the B channel.

8. The mobile terminal of claim 7, wherein the camera is a camera disposed on a rear face of the terminal; and the fingertip region detection module is configured to detect the fingertip region from the finger region using an AdaBoost algorithm.

9. The mobile terminal of claim 7, wherein the finger region detection module is configured to convert the target image into YCbCr colors according to an RGB color model, to apply a skin color threshold to the target image to binary-code the target image, and to remove noise using erosion and dilation operations, to thereby detect the finger image.

10. The mobile terminal of claim 7, wherein the 3D coordinate calculating module is configured to calculate the 3D coordinate values using an x coordinate FingerRegion.x of a start point of the fingertip region, a y coordinate FingerRegion.y of the start point of the fingertip region, a width FingerWidth of the fingertip region, and a height FingerHeight of the fingertip region.

11. The mobile terminal of claim 10, wherein the x-coordinate value and the y-coordinate value of the 3D coordinate values are calculated by the following equations:

$$\text{Finger Point}(x) = \text{Finger Region} \cdot x + \left(\frac{\text{Finger Width}}{2}\right), \text{ and}$$

$$\text{Finger Point}(y) = \text{Finger Region} \cdot y + \left(\frac{\text{Finger Height}}{2}\right).$$

12. The mobile terminal of claim 10, wherein the z-coordinate value of the 3D coordinate values is set using a distance between the camera and the finger, the distance calculated by the following equation:

$$\text{FingertoCameraDistance} = \frac{\text{finger width (cm)} \times \text{preview width (pixel)}}{\text{pixel distace of finger width (pixel)} \times \tan(FOV/2) \times 2},$$

Where the fingerwidth represents the width of a user's real finger, the previewwidth represents the number of pixels corresponding to the width of the target image input to the camera, the pixel distance of finger width represents the number of pixels corresponding to the width of the fingertip region, and the FOV represents a viewing angle of the camera.

13. A mobile terminal for generating 3D coordinates using a finger image, comprising:

a camera configured to acquire a target image including a finger region;

a memory in which a finger region detection code for detecting the finger region from the target image using an image processing technique, a fingertip region detection code for detecting a fingertip region from the finger region, and a 3D coordinate calculating code for calculating 3D coordinate values using the fingertip region are stored; and a processor configured to execute the finger region detection code stored in the memory to detect the finger region from the target image acquired by the camera, to execute the fingertip region detection code stored in the memory to detect the fingertip region from the finger region, and to execute the 3D coordinate calculating code stored in the memory to calculate the 3D coordinate values, wherein the processor is configure to execute the finger region detection code which detect the finger region, using a morphological gradient image including maximum morphological gradients among R channel, G channel and B channel at each pixel of the target image, wherein the processor executes the finger region detection code to detect the morphological gradient image from the target image using RGB gradient information, detects a finger image resulting from removing a background from the target image using YCbCr color information, and combines the morphological gradient image with the finger image to detect the finger region, wherein the processor is configured to combine pixels with the maximum morphological gradients with each other with respect to individual R, G, and B channels using the following equation to detect the morphological gradient image:

$$MMGC = \sum_{j}^{height} \sum_{i}^{width} \max(MG_r(j, i), MG_g(j, i), MG_b(j, i)),$$

where i and j represent pixel coordinates, MGr represents pixels with a maximum morphological gradient in the R channel, MGg represents pixels with a maximum morphological gradient in the G channel, and MGb represents pixels with a maximum morphological gradient in the B channel.

14. The mobile terminal of claim 13, wherein the camera is a camera disposed on a rear face of the mobile terminal; and the fingertip region detection code for detecting the fingertip region from the finger region uses an AdaBoost algorithm.

15. The mobile terminal of claim 13, wherein the processor calculates the 3D coordinate values using an x coordinate FingerRegion.x of a start point of the fingertip region, a y coordinate FingerRegion.y of the start point of the fingertip region, a width FingerWidth of the fingertip region, and a height FingerHeight of the fingertip region.

16. The mobile terminal of claim 15, wherein the processor calculates an x-coordinate value of the 3D coordinate values using the x coordinate of the start point of the fingertip region.

17. The mobile terminal of claim 15, wherein the processor calculates a y-coordinate value of the 3D coordinate values using the y coordinate of the start point of the fingertip region.

18. The mobile terminal of claim 13, wherein the processor calculates a distance between the camera and the finger based on a change of at least one of the width, height and area of the fingertip region to set a z-coordinate value of the 3D coordinate values.

* * * * *